United States Patent
Sato et al.

(10) Patent No.: US 10,585,255 B2
(45) Date of Patent: Mar. 10, 2020

(54) INTERMITTENT-CONNECTION-TYPE OPTICAL FIBER RIBBON WITH THICK AND THIN VERTICAL LINES AND METHOD FOR MANUFACTURING

(71) Applicant: SUMITOMO ELECTRIC INDUSTRIES, LTD., Osaka-shi, Osaka (JP)

(72) Inventors: Fumiaki Sato, Yokohama (JP); Keisuke Okada, Yokohama (JP); Yoshiaki Nagao, Yokohama (JP); Nobuyuki Suzuki, Yokohama (JP); Yuuki Shimoda, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/771,706

(22) PCT Filed: Dec. 22, 2016

(86) PCT No.: PCT/JP2016/088549
§ 371 (c)(1),
(2) Date: Apr. 27, 2018

(87) PCT Pub. No.: WO2017/122518
PCT Pub. Date: Jul. 20, 2017

(65) Prior Publication Data
US 2018/0321454 A1    Nov. 8, 2018

(30) Foreign Application Priority Data

Jan. 13, 2016 (JP) ................................. 2016-004682
Jan. 29, 2016 (JP) ................................. 2016-016402

(51) Int. Cl.
*G02B 6/44* (2006.01)

(52) U.S. Cl.
CPC ............ *G02B 6/4404* (2013.01); *G02B 6/44* (2013.01); *G02B 6/441* (2013.01); *G02B 6/448* (2013.01); *G02B 6/4482* (2013.01)

(58) Field of Classification Search
CPC .... G02B 6/4404; G02B 6/4482; G02B 6/441; G02B 6/448
See application file for complete search history.

(56) References Cited

U.S. PATENT DOCUMENTS 5,121,133 A * 6/1992 Chiang ...................... B41J 2/01
101/35
5,136,673 A * 8/1992 Yoshizawa ........... G02B 6/4408
385/103

(Continued)

FOREIGN PATENT DOCUMENTS

JP    A-S62-134612     6/1987
JP    2009-163045 A    7/2009

(Continued)

OTHER PUBLICATIONS

International Search Report of Mar. 28, 2017 for International application No. PCT/JP2016/088549 (Year: 2017).*

*Primary Examiner* — Andrew Jordan
(74) *Attorney, Agent, or Firm* — Drinker Biddle & Reath LLP

(57) ABSTRACT

An intermittent-connection-type optical fiber ribbon includes: a plurality of optical fiber core wires that are disposed in parallel; a connecting resin that is coated on surfaces of the plurality of optical fiber core wires; and slits that are provided intermittently in the connecting resin partially between the optical fiber core wires in a longitudinal direction, and a marking is on the connecting resin.

10 Claims, 9 Drawing Sheets

(56) References Cited

U.S. PATENT DOCUMENTS

| | | | | |
|---|---|---|---|---|
| 5,233,678 A * | 8/1993 | Katurashima | G02B 6/4403 | 385/100 |
| 5,249,249 A * | 9/1993 | Eoll | G02B 6/4403 | 385/110 |
| 5,379,363 A * | 1/1995 | Bonicel | G02B 6/4482 | 347/106 |
| 5,517,591 A * | 5/1996 | Wagman | G02B 6/4408 | 385/105 |
| 5,651,082 A * | 7/1997 | Eoll | G02B 6/4408 | 385/105 |
| 6,052,502 A * | 4/2000 | Coleman | G02B 6/4407 | 385/100 |
| 7,050,688 B2 * | 5/2006 | Lochkovic | G02B 6/4402 | 385/114 |
| 8,412,014 B2 * | 4/2013 | Sato | G02B 6/4404 | 385/100 |
| 9,008,478 B2 * | 4/2015 | Matsuzawa | G02B 6/4482 | 385/115 |
| 9,116,321 B2 * | 8/2015 | Sato | G02B 6/4403 | |
| 9,618,717 B2 * | 4/2017 | Ito | G02B 6/4405 | |
| 2001/0028773 A1 * | 10/2001 | Kato | G02B 6/02219 | 385/109 |
| 2003/0086665 A1 * | 5/2003 | Nechitailo | G02B 6/4407 | 385/110 |
| 2005/0013573 A1 * | 1/2005 | Lochkovic | G02B 6/4402 | 385/128 |
| 2005/0281518 A1 * | 12/2005 | Tanaka | G02B 6/4403 | 385/114 |
| 2012/0189257 A1 * | 7/2012 | Kasahara | C03C 25/106 | 385/114 |
| 2013/0028563 A1 * | 1/2013 | Matsuzawa | G02B 6/4482 | 385/120 |
| 2014/0314382 A1 * | 10/2014 | Sato | G02B 6/4403 | 385/103 |
| 2015/0192748 A1 * | 7/2015 | Sato | G02B 6/4403 | 385/114 |
| 2015/0234139 A1 * | 8/2015 | Cignarale | G02B 6/4403 | 385/114 |
| 2016/0299310 A1 * | 10/2016 | Kaneko | G02B 6/44 | |
| 2017/0082813 A1 * | 3/2017 | Cignarale | G02B 6/4403 | |
| 2018/0164522 A1 * | 6/2018 | Cignarale | G02B 6/4403 | |
| 2018/0321454 A1 * | 11/2018 | Sato | G02B 6/44 | |
| 2018/0321455 A1 * | 11/2018 | Cignarale | G02B 6/4403 | |

FOREIGN PATENT DOCUMENTS

| | | |
|---|---|---|
| JP | 2010-286735 A | 12/2010 |
| JP | 2012-027129 A | 2/2012 |
| JP | 2012-27130 A | 2/2012 |
| JP | 2013-88619 A | 5/2013 |
| JP | 2013-205501 A | 10/2013 |
| JP | 2014-228688 A | 12/2014 |
| JP | 2015-108756 A | 6/2015 |
| WO | WO-2013/065640 A1 | 5/2013 |
| WO | WO-2015-174182 A1 | 11/2015 |

* cited by examiner

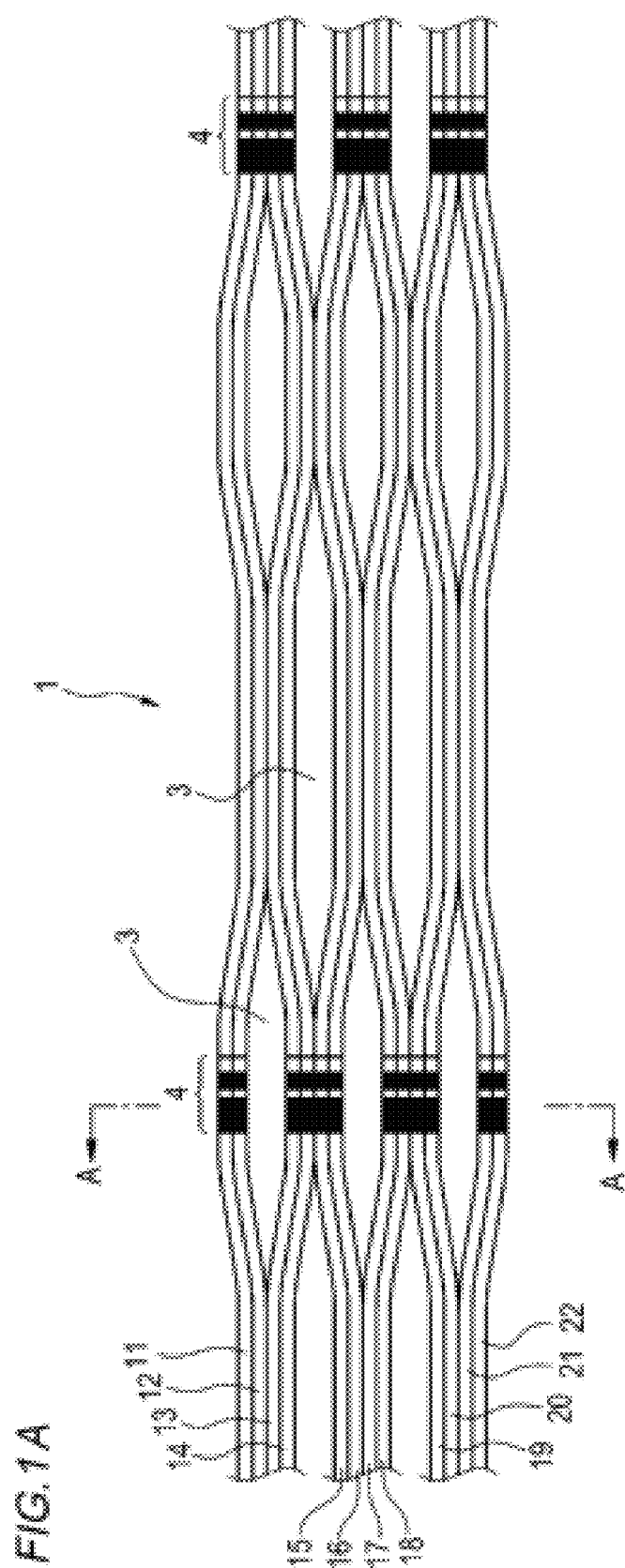

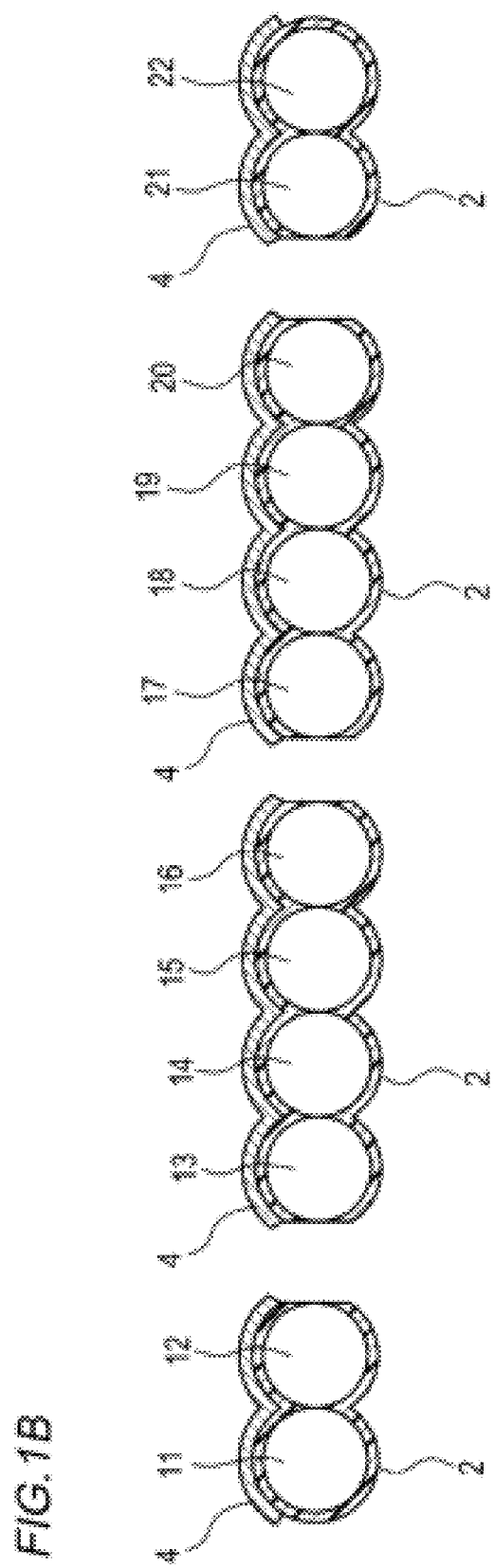

INTERMITTENT-CONNECTION-TYPE OPTICAL FIBER RIBBON WITH THICK AND THIN VERTICAL LINES AND METHOD FOR MANUFACTURING

TECHNICAL FIELD

The present invention relates to an intermittent-connection-type optical fiber ribbon, an optical cable, and a manufacturing method of an intermittent-connection-type optical fiber ribbon.

This application claims priority from Japanese Patent Application No. 2016-004682, filed on Jan. 13, 2016, and Japanese Patent Application No. 2016-016402, filed on Jan. 29, 2016, entire subject matters of which are incorporated herein by reference.

BACKGROUND ART

Patent Document 1 discloses an optical fiber ribbon in which a marking for identifying the optical fiber ribbon is provided in advance separately in each optical fiber at a position where an arbitrary connecting part of a plurality of connecting parts is provided or at positions of all the connecting parts. Patent Document 2 discloses an optical fiber optical cable in which color hues of a plurality of single coated optical fibers constituting an optical fiber ribbon are within the same hue in five basic hues of the Munsell hue circle. Patent Document 3 discloses an optical fiber cable in which the same ring mark is formed to optical fibers in the same intermittently fixed ribbon so that an optical unit (optical unit having intermittently fixed ribbons housed in a tube) can be identified.

CITATION LIST

Patent Documents

Patent Document 1: JP-A-2013-88619
Patent Document 2: JP-A-2010-286735
Patent Document 3: WO2013/065640 brochure

SUMMARY OF INVENTION

Means for Solving Problems

An intermittent-connection-type optical fiber ribbon according to an embodiment of the present disclosure includes: a plurality of optical fiber core wires that are disposed in parallel; a connecting resin that is coated on surfaces of the plurality of optical fiber core wires; and slits that are provided intermittently in the connecting resin partially between the optical fiber core wires in a longitudinal direction, and a marking is on the connecting resin.

An optical cable according to an embodiment of the present disclosure includes: a cylindrical tube; and a plurality of the intermittent-connection-type optical fiber ribbons, and the plurality of intermittent-connection-type optical fiber ribbons have different markings, and are covered with the tube in a state of being bundled.

An optical cable according to another embodiment of the present disclosure includes: a slot rod that includes a plurality of slot grooves; and a plurality of the intermittent-connection-type optical fiber ribbons, the plurality of intermittent-connection-type optical fiber ribbons have different markings, and are housed separately in the slot grooves.

A manufacturing method of an intermittent-connection-type optical fiber ribbon according to an embodiment of the present disclosure includes: a step of disposing a plurality of optical fiber core wires in parallel; a step of coating a connecting resin which is easily released, on surfaces of the plurality of optical fiber core wires; a step of printing a marking to a surface of the connecting resin; and a step of forming slits intermittently in the connecting resin in a longitudinal direction partially between the optical fiber core wires to form a shape of an intermittent-connection-type optical fiber ribbon.

BRIEF DESCRIPTION OF DRAWINGS

FIG. 1A is a plan view showing an example of a configuration of an intermittent-connection-type optical fiber ribbon according to a first embodiment.
FIG. 1B is a cross-sectional view of FIG. 1A.

DESCRIPTION OF EMBODIMENTS

Figure 2:
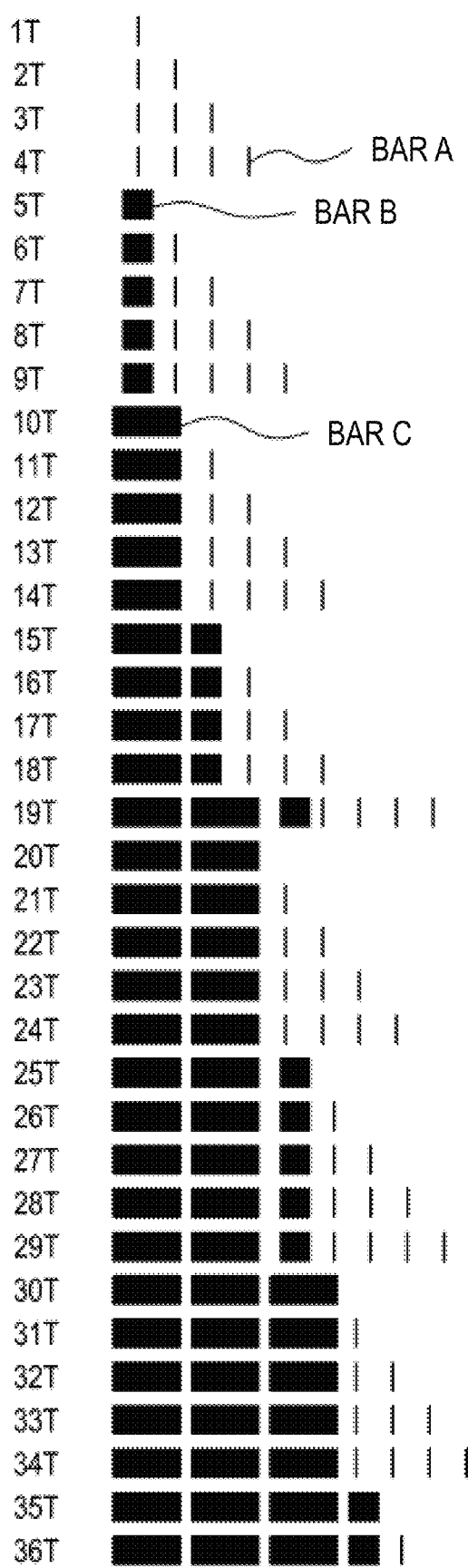
FIG. 2 is a diagram showing an example in which a marking is configured by a plurality of print patterns.

Problems to be Solved by the Present Disclosure

In an intermittent-connection-type optical fiber ribbon mounted in an optical cable, a method is known for identifying a ribbon when a ribbon is taken out from the optical cable. For example, Patent Document 1 discloses an optical fiber ribbon in which a marking for identifying an optical fiber ribbon is provided in advance separately in each optical fiber at a position where an arbitrary connecting part of a plurality of connecting parts is provided or at positions of all the connecting parts. Patent Document 2 discloses an optical fiber optical cable in which color hues of a plurality of single coated optical fibers constituting an optical fiber ribbon are within the same hue in five basic hues of the Munsell hue circle.

As described in Patent Document 1, in a case where the marking for identifying a ribbon is applied to each optical fiber core wire, chipping likely occurs during printing of the marking, and visibility of an optical fiber is bad when the optical fiber is thin. Further, marking work is not easy since the marking is provided in advance to optical fiber core wires one by one, and thereafter, it is also difficult to align positions within the marking since a resin is filled in a gap between optical fibers to connect the optical fibers. As described in Patent Document 2, in a case where an optical fiber is identified by a color of a coating thereof, optical fiber core wires of the same color have to be used when the number of optical fiber core wires constituting an optical fiber ribbon increases, and distinguishability thereof is bad. Further, in a case where the number of ribbons is large, it is difficult to identify the ribbons only by color.

Therefore, a first object of the present disclosure is to provide an intermittent-connection-type optical fiber ribbon, an optical cable, and a manufacturing method of an intermittent coupled optical fiber ribbon, in which a ribbon is easily identified when, for example, an intermittent-connection-type optical fiber ribbon is taken out from an optical cable, and a marking for identifying a ribbon is easily printed.

Further, it is necessary to align optical fibers in an arrangement order in a case, for example, where optical fiber ribbons are fusion-spliced to each other. Therefore, it is necessary to first confirm an arrangement order of optical fibers in an optical fiber ribbon.

The arrangement order of optical fibers is confirmed as long as individual optical fibers can be identified. Accordingly, for example, as described in Patent Document 3, a color layer of a unique color is conventionally formed to each optical fiber core wire for identification. However, in order to confirm the arrangement order of optical fiber core wires in a case where a color layer of a unique color is formed to each optical fiber core wire, a common recognition between a user and a manufacturer is necessary regarding a rule of a color arrangement order of optical fibers. Further, the number of identifiable colors may be insufficient when there are multiple optical fiber ribbons. In a case, for example, where an optical fiber ribbon is fusion-spliced in a dark environment such as an underground manhole, it is difficult to visually recognize a difference in color, and a connection mistake may be made by mistaking the arrangement order.

Meanwhile, the ring mark disclosed in Patent Document 3 cannot be used to identify individual optical fibers since the same ring mark is formed to optical fibers in the same optical fiber ribbon. Assuming a case where a different ring mark is formed to each optical fiber in the optical fiber cable, there is a problem in cost and practical use since types of ring marks increase and management and forming steps of the ring marks are complicated.

Therefore, a second object of the present disclosure is to provide an optical fiber ribbon and an optical cable, in which an arrangement order of optical fibers in an optical fiber ribbon can be easily confirmed without depending on color arrangement of the optical fibers.

Effect of the Present Disclosure

According to the present disclosure, a ribbon can be easily identified when, for example, an intermittent-connection-type optical fiber ribbon is taken out from an optical cable, and a marking for identifying a ribbon can be easily printed.

Further, according to the present disclosure, an arrangement order of optical fibers in an optical fiber ribbon can be easily confirmed without depending on color arrangement of the optical fibers.

DESCRIPTION OF EMBODIMENTS OF THE PRESENT INVENTION

First, embodiments of the present invention will be listed and described.

An intermittent-connection-type optical fiber ribbon according to an embodiment of the present invention is (1) an intermittent-connection-type optical fiber ribbon includes: a plurality of optical fiber core wires that are disposed in parallel; a connecting resin that is coated on surfaces of the plurality of optical fiber core wires; and slits that are provided intermittently in the connecting resin partially between the optical fiber core wires in a longitudinal direction, and a marking is on the connecting resin.

Since the intermittent-connection-type optical fiber ribbon according to (1) has a marking on the connecting resin coated on the surfaces of the optical fiber core wires, marking of the intermittent-connection-type optical fiber ribbon can be made easy, and it is possible to manufacture the intermittent-connection-type optical fiber ribbon in which the ribbon is easy to identify when taken out from an optical cable.

(2) In the intermittent-connection-type optical fiber ribbon according to (1), the slits are provided between every two optical fiber core wires, and are not provided in the connecting resin in the longitudinal direction between at least some of the plurality of optical fiber core wires.

Since the slits are provided between every two optical fiber core wires, and are not provided in the connecting resin in the longitudinal direction between some wires, the marking on the connecting resin is easy to visually recognize.

(3) In the intermittent-connection-type optical fiber ribbon according to (1) or (2), the marking is a marking printed with one of a plurality of print patterns.

Since the marking is printed with one of the plurality of print patterns, a ribbon can be identified with various types of printing patterns, and the intermittent-connection-type optical fiber ribbon can also be identified easily.

(4) In the intermittent-connection-type optical fiber ribbon according to any one of (1) to (3), the marking is formed in an entire width direction on the connecting resin of the plurality of optical fiber core wires.

Since the marking is provided in the entire width direction of the connecting resin, it is easy to identify which optical fiber core wires belong to the intermittent-connection-type optical fiber ribbon even the optical fiber core wires are separated one by one.

(5) In the intermittent-connection-type optical fiber ribbon according to any one of (1) to (4), in a state where the plurality of optical fiber core wires are arranged in parallel, the marking has a constant shift of a predetermined amount between adjacent optical fiber core wires in a longitudinal direction of the arrangement.

In the optical fiber ribbon according to (5), the marking is shifted by a constant predetermined amount in the longitudinal direction of the arrangement between adjacent optical fiber core wires when the arrangement order of the optical fiber core wires is correct. Accordingly, the arrangement order of optical fiber core wires in the optical fiber ribbon can be easily confirmed without depending on color arrangement of the optical fiber core wires.

(6) In the intermittent-connection-type optical fiber ribbon according to (5), the predetermined amount is larger than 0.1 mm.

When the arrangement of the plurality of optical fiber core wires is actually manufactured, variation (wire length difference) of wire length of wires of optical fiber core wires is normally 0.1 mm/m or less. In contrast, the marking shifts by an amount larger than 0.1 mm between adjacent optical fiber core wires in the longitudinal direction of the arrangement. The shift of the marking is larger than the manufacturing variation (line length difference) of the optical fiber core wires which is considered to be 1 m, and the shift of the marking is easily identified. Therefore, identification accuracy of the arrangement order of the optical fiber core wires can be ensured more reliably.

An optical cable according to an embodiment of the present invention is (7) an optical cable includes: a cylindrical tube; and a plurality of intermittent-connection-type optical fiber ribbons according to any one of (1) to (6), and the plurality of intermittent-connection-type optical fiber ribbons have different markings, and are covered with the tube in a state of being bundled.

(8) An optical cable includes: a slot rod that includes a plurality of slot grooves; and a plurality of intermittent-connection-type optical fiber ribbons according to any one of (1) to (6), the plurality of intermittent-connection-type optical fiber ribbons have different markings, and are housed separately in the slot grooves.

Since the plurality of intermittent-connection-type optical fiber ribbon housed in optical cables according to (7) and (8) have different markings, the intermittent coupled optical fiber ribbons are easily identified when pulled out from the optical cables.

A manufacturing method of an intermittent-connection-type optical fiber ribbon according to an embodiment of the present invention includes (9) a step of disposing a plurality of optical fiber core wires in parallel;

a step of coating a connecting resin which is easily released, on surfaces of the plurality of optical fiber core wires;

a step of printing a marking to a surface of the connecting resin; and a step of forming slits intermittently in the connecting resin in a longitudinal direction partially between the optical fiber core wires to form a shape of an intermittent-connection-type optical fiber ribbon.

According to the manufacturing method of an intermittent-connection-type optical fiber ribbon according to (9), since the marking is printed on the connecting resin which is coated on the surfaces of the optical fiber core wires, marking of the intermittent-connection-type optical fiber ribbon can be made easy, and it is possible to manufacture the intermittent-connection-type optical fiber ribbon in which the ribbons are easy to identify when taken out from an optical cable.

(10) The slits are formed intermittently in the connecting resin in the longitudinal direction partially between the optical fiber core wires after the connecting resin is coated and the marking is printed.

Since the plurality of optical fibers before the slits are intermittently formed are printed in an aligned state, the marking is easily printed.

Details of Embodiments of the Present Invention

Specific embodiments of an intermittent-connection-type optical fiber ribbon, an optical cable, and a manufacturing method of an intermittent-connection-type optical fiber ribbon according to an embodiment of the present invention will be described with reference to drawings hereinafter.

Additionally, the present invention is not limited to these examples but indicated by the scope of claims, and is intended to include meanings equivalent to the scope of claims and all modifications within the scope.

First Embodiment of Optical Fiber Ribbon

FIG. 1A is a plan view showing an example of a configuration of an intermittent-connection-type optical fiber ribbon according to a first embodiment. FIG. 1B is a cross-sectional view at a position A in FIG. 1A.

As shown in FIGS. 1A and 1B, an intermittent-connection-type optical fiber ribbon 1 includes a plurality (12 pieces in the example of FIGS. 1A and 1B) of optical fiber core wires 11 to 22 which are disposed in parallel. These optical fiber core wires 11 to 22 are single coated optical fibers. Additionally, coatings of the optical fiber core wires 11 to 22 may be colored in different colors so that the optical fiber core wires can be identified with each other.

The plurality of optical fiber core wires 11 to 22 disposed in parallel are coated, on surfaces thereof, with a connecting resin 2 for connecting the optical fiber core wires to each other, so as to be aligned in parallel in a ribbon form. The connecting resin 2 is, for example, an ultraviolet-curable resin or a thermosetting resin. Here, the connecting resin 2 is preferably a resin having good releasability in order to facilitate separating an optical fiber core wire from the optical fiber core wires 11 to 22.

The intermittent-connection-type optical fiber ribbon 1 is intermittently provided with slits 3 in the connecting resin 2 in a longitudinal direction partially between optical fiber core wires of the optical fiber core wires 11 to 22. Additionally, the slits 3 may be provided intermittently between every two optical fiber core wires, and not provided in the connecting resin 2 in the longitudinal direction between at least some of the optical fiber core wires. In the example of FIGS. 1A and 1B, the slits 3 are not provided between the optical fiber core wires 11 and 12, 13 and 14, 15 and 16, 17 and 18, 19 and 20, and 21 and 22. Accordingly, visibility of a marking 4 is improved since the number of slits per unit area is reduced by intermittently providing the slits 3 between every two optical fiber core wires.

The marking 4 for identifying a ribbon is formed on the connecting resin 2 of the intermittent-connection-type optical fiber ribbon 1 according to the first embodiment. The marking 4 has a shape different from shapes of markings of other ribbons such that a ribbon can be identified with the other ribbons (a specific pattern example of a marking will be described later in detail in FIG. 2). In the example of FIG. 1, the marking 4 is configured by a pattern of a plurality of print patterns. The marking 4 is preferably formed in an entire width direction of the connecting resin 2 of the optical fiber core wires 11 to 22. By forming the marking 4 over the entire width direction of the connecting resin 2, it is easy to identify which optical fiber core wires 11 to 22 belong to the intermittent-connection-type optical fiber ribbon 1 even the optical fiber core wires 11 to 22 are separated one by one. The marking 4 may be formed with such as an ink jet printer.

Next, print patterns of the marking 4 will be described. FIG. 2 is a diagram showing an example in which a marking is configured by a plurality of print patterns.

For example, the print patterns shown in FIG. 2 are configured such that 36 pieces of ribbons (1T to 36T) can be identified. In the print patterns shown in FIG. 2, "1" is represented by a thin vertical line (bar A), "5" is represented by a thick vertical line (bar B), and "10" is represented by a thicker vertical line (bar C). For example, one bar A is a marking of a first ribbon 1T, and one bar A, one bar B, and three bars C is a marking of a 36th ribbon 36T. That is, the marking 4 shown in FIG. 1A indicates a 16th ribbon 16T since there is one bar A, one bar B, and one bar C. Additionally, a configuration of the print patterns shown in FIG. 2 is merely an example, and other configurations may be used when a ribbon can be identified.

Accordingly, a ribbon can be identified with various types of printing patterns by marking with a plurality of printing patterns, and identification of the intermittent-connection-type optical fiber ribbon 1 can also be made easy.

Second Embodiment of Optical Fiber Ribbon

Figure 7:
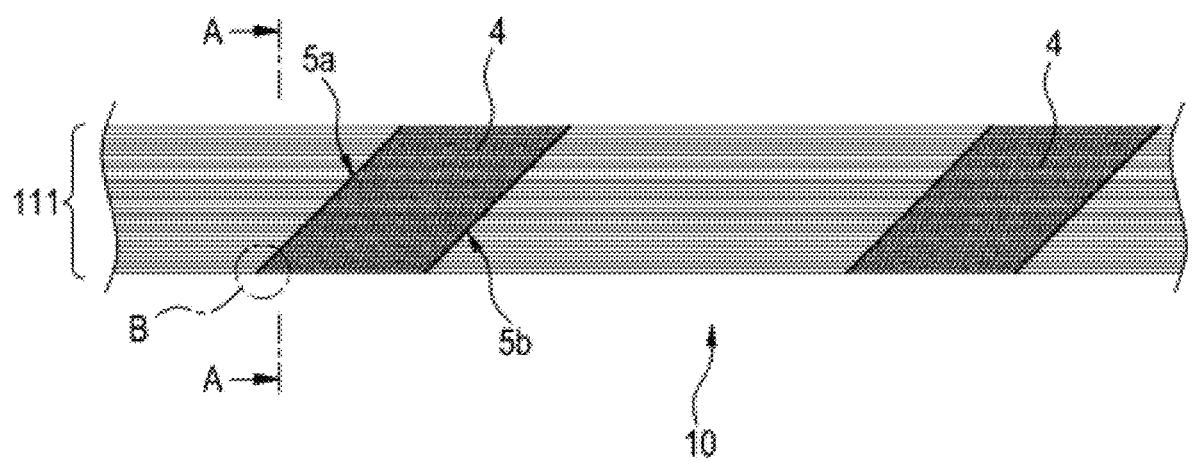
FIG. 7 is a plan view showing an example of the optical fiber ribbon according to the second embodiment.
Figure 8:
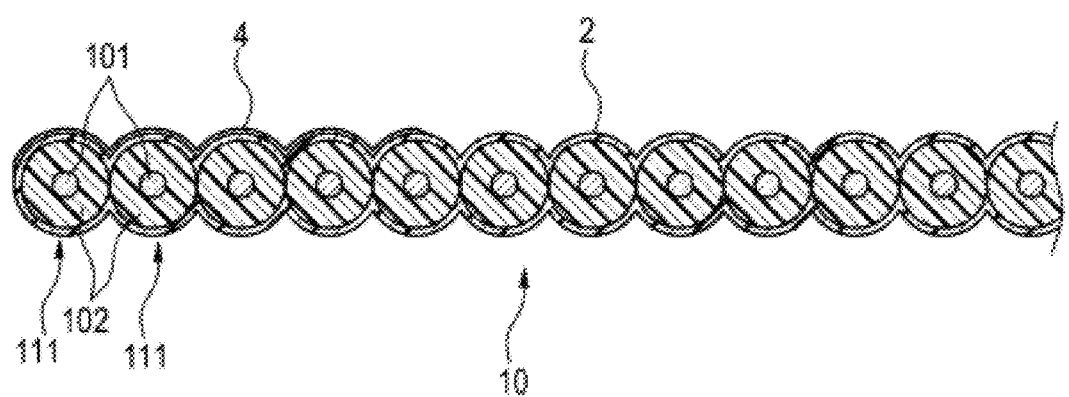
FIG. 8 is a partial view showing a cross section at a position A of FIG. 7.
Figure 9:
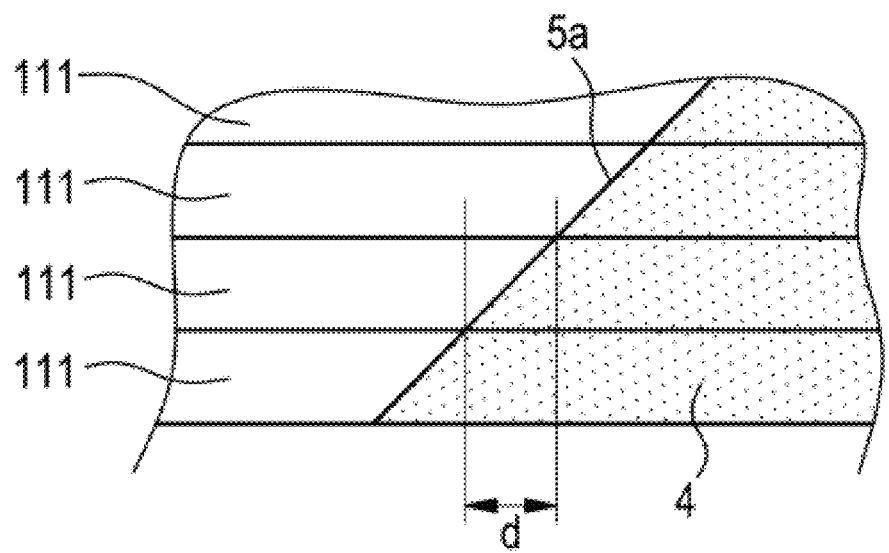
FIG. 9 is a partially enlarged view of B of FIG. 7.

FIG. 7 is a plan view showing an example of an optical fiber ribbon according to a second embodiment. FIG. 8 is a partial view showing a cross section at a position A of FIG. 7. FIG. 9 is a partially enlarged view of B of FIG. 7.

As shown in FIG. 7, an optical fiber ribbon 10 includes a plurality of optical fiber core wires 111 which are arranged in parallel. These optical fiber core wires 111, as shown in FIG. 8, are single coated optical fibers having coating layers 102 around glass fibers 101. Further, the optical fiber core wires 111 are provided with the connecting resin 2 on outer peripheries thereof, through which the optical fiber core wires 111 are connected to each other.

The optical fiber ribbon 10 has the marking 4 on the connecting resin 2 across a width direction of arrangement of the plurality of optical fiber core wires 111. As shown in FIG. 9, the marking 4 has a constant shift of a predetermined amount d in a longitudinal direction of the arrangement between adjacent optical fiber core wires 111. In the example of FIG. 7, the marking 4 is provided in a parallelogram shape inclined obliquely at a predetermined width in the longitudinal direction of the arrangement of the plurality of optical fiber core wires 111. A plurality of markings 4 are provided at a predetermined interval in the longitudinal direction of the optical fiber ribbon 10. Additionally, the markings 4 may be formed by printing with such as an ink jet printer.

Figure 10:
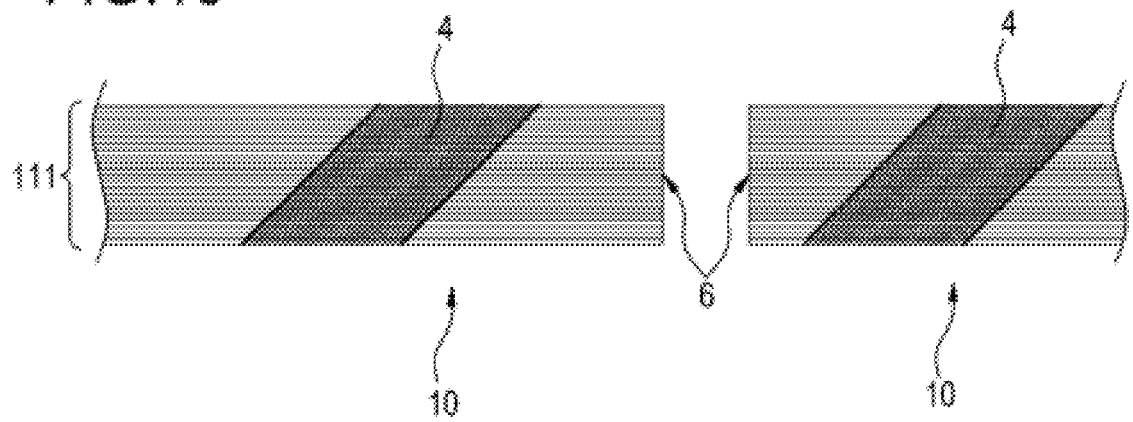
FIG. 10 is an illustrative view of fusing splicing optical fiber ribbons to each other according to the second embodiment.

In a case, for example, where optical fiber ribbons 10 are fusion-spliced to each other at end faces 6 thereof as shown in FIG. 10, it is necessary to align arrangement orders of the optical fiber ribbons for fusion. In such a case, the arrangement orders of the optical fiber ribbons are conventionally confirmed by visually recognizing a color of each optical fiber and comparing the color with a rule of a color arrangement order of the optical fiber ribbons. Therefore, it is necessary for an operator who performs fusion splicing to memorize a rule of arrangement order based on colors of optical fibers in the optical fiber ribbons to be used. Further, in a case where the optical fiber ribbons are fusion-spliced in a dark environment such as an underground manhole, it is difficult to visually recognize a difference in color, and a connection mistake may be made.

In contrast, in the optical fiber ribbon 10 in FIG. 7, both end parts 5a, 5b of the marking 4 of the optical fiber ribbon 10 in the longitudinal direction only need to be substantially oblique straight lines in a case where the arrangement order of the optical fiber core wires 111 is correct, such that the arrangement order can be easily confirmed without depending on color arrangement of the optical fiber core wires 111. Therefore, even in a case where it is difficult to visually recognize such a difference in color, the optical fiber ribbon 10 according to the second embodiment can make it possible to easily confirm the arrangement order without depending on the color arrangement of the optical fiber core wires 111. Additionally, the arrangement order of the optical fiber core wires 111 can be easily confirmed even in a darker environment when the marking 4 is formed of a fluorescent paint.

In a case, for example, where some or all adjacent optical fiber core wires 111 are intermittently connected to each other in the optical fiber ribbon 10, individual optical fiber core wires 111 are particularly likely to loosen. In the optical fiber ribbon 10 according to the second embodiment, the arrangement order is correct as long as the end portions 5a, 5b of the marking 4 are arranged in substantially oblique straight lines, such that the arrangement of loose fiber core wires 111 can be easily aligned.

In a case where the plurality of optical fiber core wires 111 in the optical fiber ribbon 10 are actually manufactured, variation (wire length difference) occurs to wire length of each wire in the plurality of optical fiber core wires 111 due to individual differences in elongation of optical fibers. The present inventors examined a wire length difference and found it to be about 0.1 mm/m or less. Therefore, the predetermined amount d of the shift in the marking 4 shown in FIG. 9 is desired to be larger than 0.1 mm. Accordingly, for example, when a marking interval is considered to be 1 m, the shift of the marking 4 is larger than the manufacturing variation (line length difference) of the optical fiber core wires 111, and the shift of the marking 4 is easily identified. Therefore, accuracy of identification of the arrangement order of the optical fiber core wires 111 can be ensured more reliably.

Figure 11A:
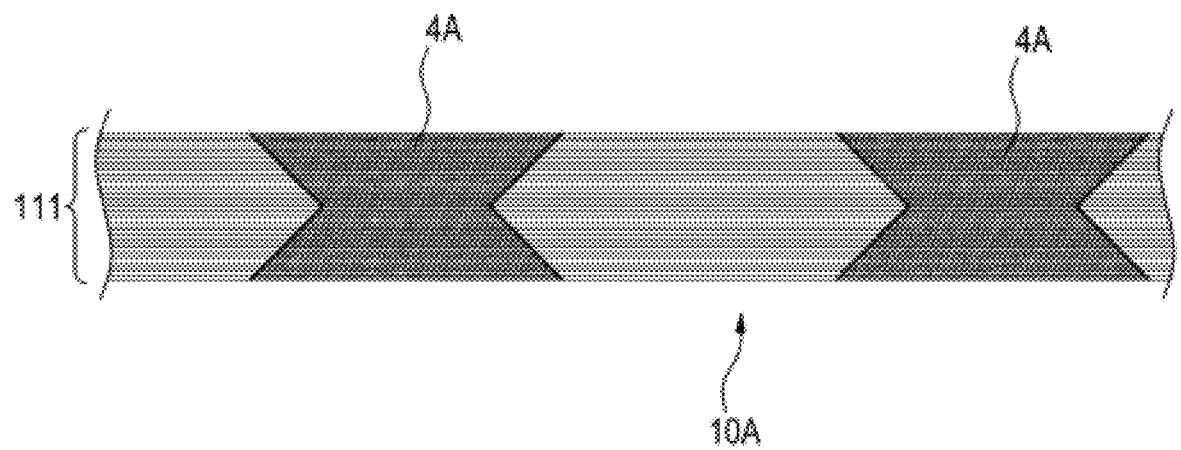
FIG. 11A is a plan view showing a first modification of the optical fiber ribbon according to the second embodiment.
Figure 11B:
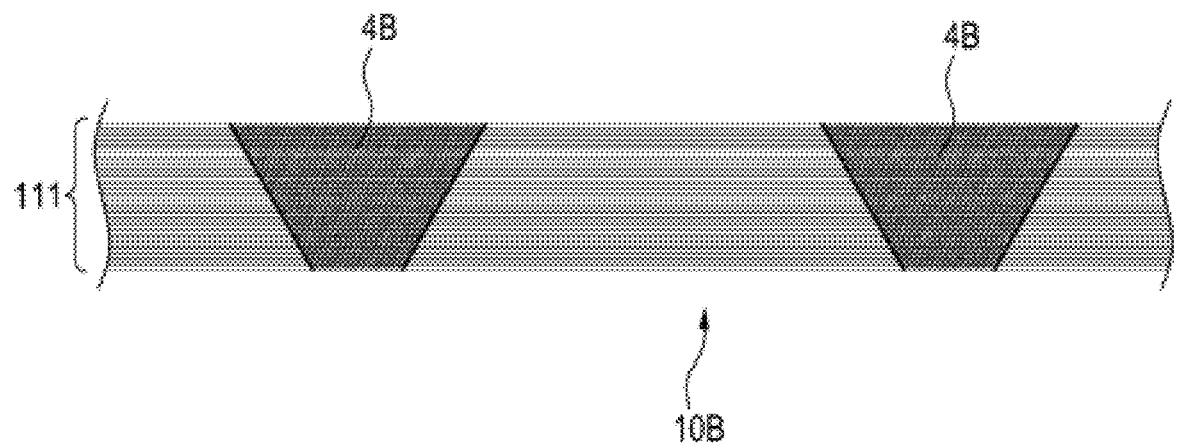
FIG. 11B is a plan view showing a second modification of the optical fiber ribbon according to the second embodiment.

Next, a modification of the marking 4 is shown in FIGS. 11A and 11B.

In an optical fiber ribbon 10A shown in FIG. 11A, width of a marking 4A (width in a longitudinal direction of arrangement of the plurality of optical fiber core wires 111) is provided to grow narrow from both ends of arrangement of the plurality of optical fiber core wires 111 toward a center of the arrangement.

In an optical fiber ribbon 10B shown in FIG. 11B, width of a marking 4B (width in the longitudinal direction of the arrangement of the plurality of optical fiber core wires 111) is provided to grow narrow from one end of the arrangement of the plurality of optical fiber core wires 111 toward the other end of the arrangement.

Structures of the above optical fiber ribbons 10A and 10B are the same as a structure of the optical fiber ribbon 10, except that shapes of markings 4A and 4B are different from the shape of the marking 4 of the optical fiber ribbon 10. That is, the markings 4A and 4B also have a constant shift of the predetermined amount d (see FIG. 9) between adjacent optical fiber core wires 111 in the longitudinal direction of the arrangement.

(Optical Cable)

Figure 3:
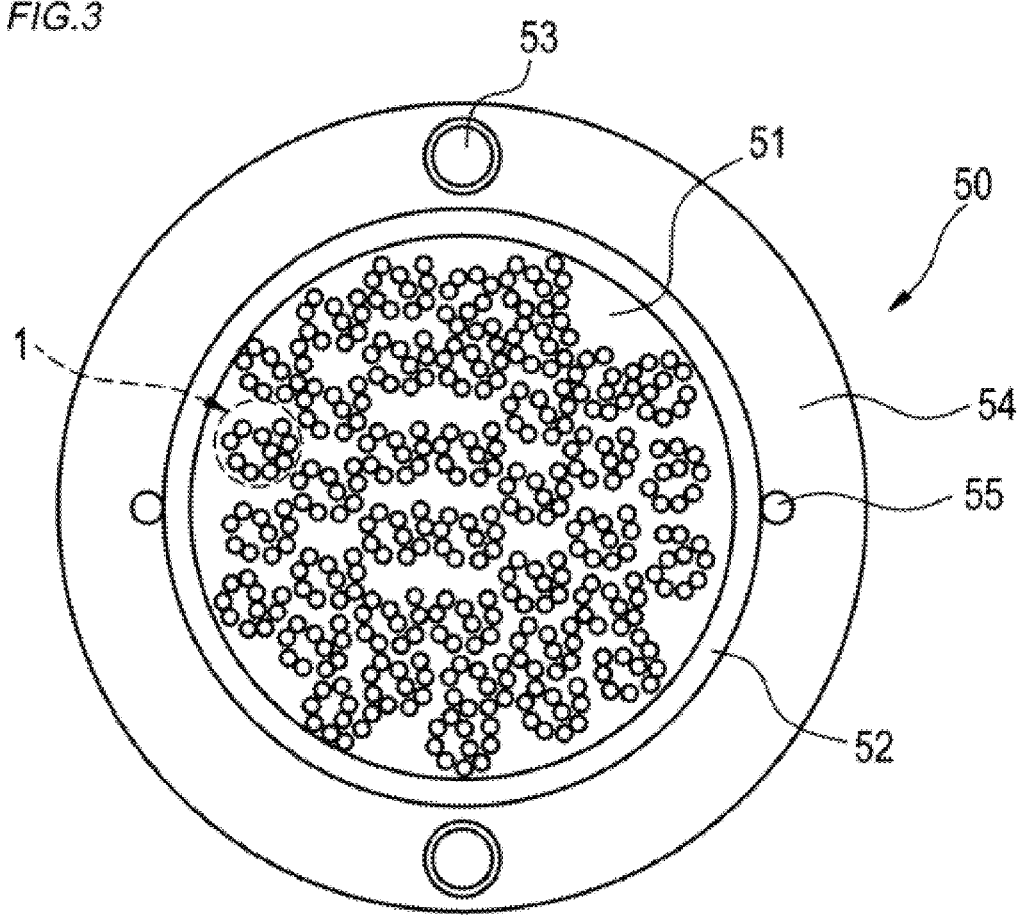
FIG. 3 shows an example of an optical cable of slot-less type using the intermittent-connection-type optical fiber ribbon according to the first embodiment or an optical fiber ribbon according to a second embodiment.
Figure 4:
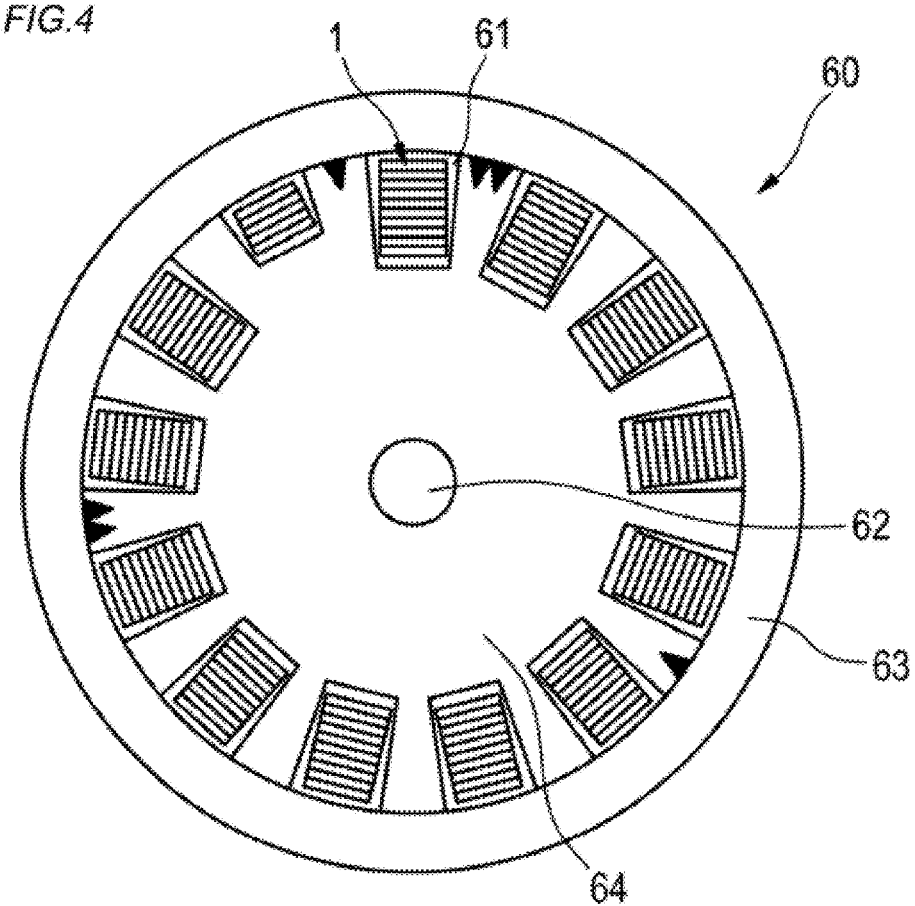
FIG. 4 shows an example of an optical cable of ribbon slot type using the intermittent-connection-type optical fiber ribbon according to the first embodiment or the optical fiber ribbon according to the second embodiment.

Next, an optical cable according to an embodiment will be described with reference to FIGS. 3 and 4. FIG. 3 shows an example of an optical cable of slot-less type using the intermittent-connection-type optical fiber ribbon 1 according to the first embodiment or the optical fiber ribbon 10 (10A, 10B) according to the second embodiment. FIG. 4 shows an example of an optical cable of ribbon slot type using the intermittent-connection-type optical fiber ribbon 1 according to the first embodiment or the optical fiber ribbon 10 (10A, 10B) according to the second embodiment.

The optical cable shown in FIG. 3 is an optical cable 50 of slot-less type which includes a cylindrical tube 52 and a plurality of intermittent-connection-type optical fiber ribbons 1 or optical fiber ribbons 10 (10A, 10B). The plurality (for example, 36 pieces) of intermittent-connection-type optical fiber ribbons 1 or optical fiber ribbons 10 (10A, 10B) have different markings 4, and are bundled by an interposition 51 such as an aramid fiber. Additionally, a water absorption yarn may be inserted in a case where waterproof property is required. The optical cable 50 has a structure in which a resin around the intermittent-connection-type optical fiber ribbons 1 which serves as the tube 52 is extruded while the intermittent-connection-type optical fiber ribbons 1 are stranded. The tube 52, together with a tension member 53, is covered by a sheath 54. The resin serving as the tube 52 uses a hard material such as PBT and HDPE. Here, 55 is a tearing string.

The optical cable shown in FIG. 4 is an optical cable 60 of ribbon slot type which includes a slot rod 64 having a plurality of slot grooves 61 and the intermittent-connection-type optical fiber ribbons 1 or the optical fiber ribbons 10 (10A, 10B). The optical cable 60 has a structure in which the slot grooves 61 are radially provided in the slot rod 64 which has a tension member 62 at a center thereof. The plurality of intermittent-connection-type optical fiber ribbons 1 or the optical fiber ribbons 10 (10A, 10B) have different markings 4, and are housed in the plurality of slot grooves 61 in a state of being laminated. A sheath 63 is formed around the slot rod 64.

(Manufacturing Method of Intermittent-Connection-Type Optical Fiber Ribbon)

Figure 5A:
FIG. 5A is a plan view of an optical fiber ribbon coated with a connecting resin.
Figure 5B:
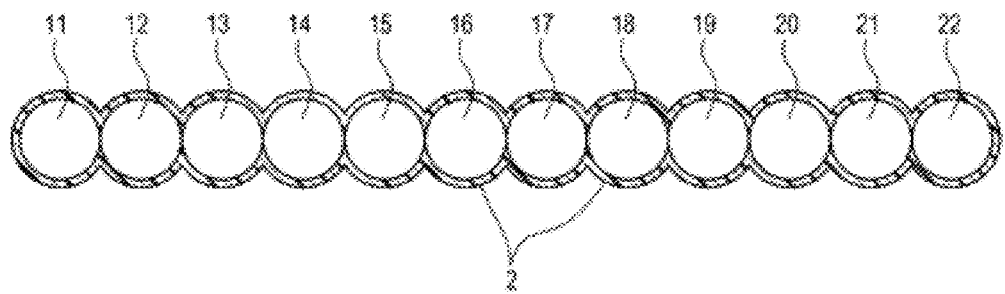
FIG. 5B is a cross-sectional view of FIG. 5A.
Figure 6A:
FIG. 6A is a plan view of an optical fiber ribbon in which a marking is formed in a connecting resin.
Figure 6B:
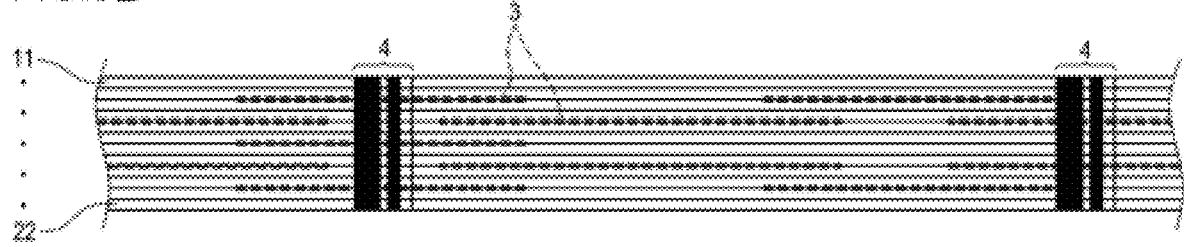
FIG. 6B is a plan view of an optical fiber ribbon in which slits are formed intermittently in a connecting resin in a longitudinal direction partially between optical fiber core wires.

Next, a manufacturing method of an intermittent-connection-type optical fiber ribbon according to the first embodiment will be described with reference to FIGS. 5A, 5B, 6A, and 6B. FIG. 5A is a plan view of an optical fiber ribbon coated with the connecting resin 2. FIG. 5B is a cross-sectional view of an optical fiber ribbon coated with the connecting resin 2. FIG. 6A is a plan view of an optical fiber ribbon in which the marking 4 is formed in the connecting resin 2. FIG. 6B is a plan view of an optical fiber ribbon in which slits are formed intermittently in the connecting resin 2 in a longitudinal direction partially between optical fiber core wires.

As shown in FIGS. 5A and 5B, the plurality of optical fiber core wires 11 to 22 are disposed in parallel.

The optical fiber core wires 11 to 22 are coated with the connecting resin 2 which is easily released. In FIGS. 5A and 5B, the connecting resin 2 is coated on an entire surface of the optical fiber core wires 11 to 22 which are disposed in parallel, and may also be coated on only one side or on only a part thereof where adjacent optical fiber core wires may be connected to each other.

Next, as shown in FIG. 6A, the marking 4 is printed on a surface of the connecting resin 2 of the intermittent-connection-type optical fiber ribbon 1 using such as an ink jet printer while running the intermittent-connection-type optical fiber ribbon 1 in the longitudinal direction. At this time, the marking 4 is preferably printed over an entire width direction of the connecting resin 2 on one side of the intermittent-connection-type optical fiber ribbon 1. Additionally, the marking 4 may be printed on an entire surface of the intermittent-connection-type optical fiber ribbon 1, but one-side printing is easier. In a case where a running speed of the intermittent-connection-type optical fiber ribbon 1 is high when printing is performed using an ink jet printer, the printed marking 4 may become oblique.

Next, as shown in FIG. 6B, the slits 3 are formed intermittently, by such as a rotary blade, in the connecting resin 2 in the longitudinal direction partially between the optical fiber core wires. Accordingly, the intermittent-connection-type optical fiber ribbon 1 shown in FIGS. 1A and 1B is formed.

In the above manufacturing method of the intermittent-connection-type optical fiber ribbon, since the slits 3 are formed after the marking 4 is printed, the marking 4 can be printed in a state where the optical fiber core wires 11 to 22 are aligned, it is easy to print the marking 4.

Additionally, the marking 4 may also be printed after the slits 3 are formed first.

The forming of the intermittent slits 3 is not limited to the above method, and may also be formed by forming a connecting part and a non-connecting part via coating the connecting resin 2 intermittently during coating (a place where the connecting resin 2 is not coated forms an intermittent slit 3).

Additionally, even in a case of the optical fiber ribbon 10 (10A, 10B) according to the second embodiment, it is possible to manufacture an intermittent-connection-type optical fiber ribbon in the same manner, in which some or all adjacent optical fiber core wires 111 are intermittently connected to each other.

The above intermittent-connection-type optical fiber ribbon 1 according to the first embodiment described in detail has the marking 4 on the connecting resin 2 which is coated on surfaces of the optical fiber core wires 11 to 22. Accordingly, marking of the ribbon can be made easy, and the ribbon is easily identified when taken out from an optical cable.

In the optical fiber ribbon 10 (10A, 10B) according to the second embodiment, the marking 4 is shifted by a constant predetermined amount d in the longitudinal direction of the arrangement between adjacent optical fiber core wires 111 in a case where the arrangement order of the optical fiber core wires 111 is correct. Accordingly, the arrangement order of optical fiber core wires in the optical fiber ribbon (10A, 10B) can be easily confirmed without depending on the color arrangement of the optical fiber core wires 111.

Since the plurality of intermittent-connection-type optical fiber ribbons 1 housed in optical cables 50 and 60 have different markings 4, the intermittent-connection-type optical fiber ribbons 1 are easily identified when pulled out from the optical cables 50 and 60.

When the optical fiber ribbons 10 (10A, 10B) are pulled out from the optical cables 50 and 60, the arrangement order of the optical fiber core wires 111 can be easily confirmed without depending on the color arrangement of the optical fiber core wires 111. Further, the optical fiber ribbon 10 is easily identified since the optical fiber ribbons 10 (10A, 10B) have different markings 4.

Further, in the manufacturing method of the intermittent-connection-type optical fiber ribbon 1, the marking 4 is printed on the connecting resin 2 which is coated on the surfaces of the optical fiber core wires 11 to 20. Accordingly, marking of the ribbon can be made easy, and it is possible to manufacture the intermittent-connection-type optical fiber ribbon 1 in which the ribbon is easy to identify when taken out from an optical cable.

DESCRIPTION OF REFERENCE NUMERALS

1 intermittent-connection-type optical fiber ribbon
2 connecting resin
3 slit
4, 4A, 4B marking
5*a*, 5*b* end part of marking
6 end surface of optical fiber ribbon 10, 10A, 10B optical fiber ribbon
11 to 22, 111 optical fiber core wire
50, 60 optical cable
51 interposition
52 tube
53, 62 tension member
54, 63 sheath
55 tearing string
61 slot groove
64 slot rod
101 glass fiber
102 coating layer

The invention claimed is:

1. An intermittent-connection-type optical fiber ribbon comprising:
    a plurality of optical fiber core wires that are disposed in parallel;
    a connecting resin that is coated on surfaces of the plurality of optical fiber core wires; and
    slits that are provided intermittently in the connecting resin partially between the optical fiber core wires in a longitudinal direction,
    wherein a marking is on the connecting resin,
    wherein the marking has a predetermined width in a longitudinal direction of the arrangement,
    wherein in a state where the plurality of optical fiber core wires are arranged in parallel, the marking has a constant shift of a predetermined amount between adjacent optical fiber core wires in the longitudinal direction of the arrangement, the constant shift of the predetermined amount being larger than 0.1 mm,
    wherein the marking includes a thin vertical line, and a thick vertical line which has a bar shape extending in the longitudinal direction of the arrangement, and
    wherein both end parts of the bar-shaped marking of the optical fiber ribbon in the longitudinal direction form oblique straight lines with respect to the longitudinal direction.

2. The intermittent-connection-type optical fiber ribbon according to claim 1,
    wherein the slits are provided between every two optical fiber core wires, and are not provided in the connecting resin in the longitudinal direction between at least some of the plurality of optical fiber core wires.

3. The intermittent-connection-type optical fiber ribbon according to claim 1,
    wherein the marking is a marking printed with one of a plurality of print patterns.

4. The intermittent-connection-type optical fiber ribbon according to claim 1,
    wherein the marking is formed in an entire width direction on the connecting resin of the plurality of optical fiber core wires.

5. An optical cable comprising:
    a cylindrical tube; and
    a plurality of intermittent-connection-type optical fiber ribbons according to claim 1,
    wherein the plurality of intermittent-connection-type optical fiber ribbons have different markings, and are covered with the tube in a state of being bundled.

6. An optical cable comprising:
    a slot rod that includes a plurality of slot grooves; and
    a plurality of intermittent-connection-type optical fiber ribbons according to claim 1,
    wherein the plurality of intermittent-connection-type optical fiber ribbons have different markings, and are housed separately in the slot grooves.

7. The intermittent-connection-type optical fiber ribbon according to claim 1,
    wherein the plurality of optical fiber core wires is colored in different colors.

8. The intermittent-connection-type optical fiber ribbon according to claim 1,
    wherein the widths of the markings of the plurality of the optical fiber core wires gradually narrow from both end parts of each bar-shaped marking.

9. A manufacturing method of an intermittent-connection-type optical fiber ribbon comprising:
    a step of disposing a plurality of optical fiber core wires in parallel;
    a step of coating a connecting resin which is easily released, on surfaces of the plurality of optical fiber core wires;
    a step of printing a marking to a surface of the connecting resin; and
    a step of forming slits intermittently in the connecting resin in a longitudinal direction partially between the optical fiber core wires to form a shape of an intermittent-connection-type optical fiber ribbon,
    wherein the marking has a predetermined width in a longitudinal direction of the arrangement,
    wherein in a state where the plurality of optical fiber core wires are arranged in parallel, the marking has a constant shift of a predetermined amount between adjacent optical fiber core wires in the longitudinal direction of the arrangement, the constant shift of the predetermined amount being larger than 0.1 mm,
    wherein the marking includes a thin vertical line, and a thick vertical line which has a bar shape extending in the longitudinal direction of the arrangement, and
    wherein both end parts of the bar-shaped marking of the optical fiber ribbon in the longitudinal direction form oblique straight lines with respect to the longitudinal direction.

10. The manufacturing method of an intermittent-connection-type optical fiber ribbon according to claim 9,
    wherein the slits are formed intermittently in the connecting resin in the longitudinal direction partially between the optical fiber core wires after the connecting resin is coated and the marking is printed.

* * * * *